United States Patent
Dreimann et al.

(10) Patent No.: US 10,404,386 B1
(45) Date of Patent: Sep. 3, 2019

(54) MOBILE RADIO COMMUNICATION TEST SYSTEM AND METHOD

(71) Applicant: Rohde & Schwarz GmbH & Co. KG, Munich (DE)

(72) Inventors: Michael Dreimann, Munich (DE); Rishyashangar Theivendran, Cambridge (CA); Manish Chibba, Putzbrunn (DE); Dimo Dimitrov, Unterhaching (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/993,129

(22) Filed: May 30, 2018

(51) Int. Cl.
  *H04B 17/00* (2015.01)
  *H04B 17/30* (2015.01)

(52) U.S. Cl.
  CPC .................................. *H04B 17/30* (2015.01)

(58) Field of Classification Search
  USPC ....................................................... 455/67.11
  See application file for complete search history.

(56) References Cited

U.S. PATENT DOCUMENTS

| | | | | |
|---|---|---|---|---|
| 2006/0128373 A1* | 6/2006 | Cochrane | ............... | H04M 1/24 455/424 |
| 2013/0259097 A1* | 10/2013 | Olgaard | ............... | H04W 56/00 375/219 |
| 2014/0115409 A1* | 4/2014 | Miller | ............... | G01R 31/3171 714/703 |
| 2018/0062971 A1* | 3/2018 | Kyosti | ................... | H04L 43/50 |
| 2018/0368011 A1* | 12/2018 | Foegelle | ............. | H04B 7/0617 |

FOREIGN PATENT DOCUMENTS

| | | |
|---|---|---|
| DE | 112013005799 T5 | 8/2015 |
| EP | 1722529 A1 | 11/2006 |

* cited by examiner

*Primary Examiner* — Edward F Urban
*Assistant Examiner* — Max Mathew
(74) *Attorney, Agent, or Firm* — Ditthavong & Steiner P. C.

(57) ABSTRACT

A mobile radio communication test system is provided. The mobile radio communication test system comprises a mobile radio test device, a device under test adapted to establish a communication with the mobile radio test device, and a message modification engine configured to monitor at least one message exchanged between the mobile radio test device and the device under test, wherein depending on the content of the at least one message, the message modification engine is further configured to modify the at least one message and/or at least one parameter thereof in both directions.

16 Claims, 3 Drawing Sheets

MOBILE RADIO COMMUNICATION TEST SYSTEM AND METHOD

TECHNICAL FIELD

The invention relates to a mobile radio communication test system especially comprising a device under test, a mobile radio test device, and a message modification engine. Additionally, a corresponding mobile radio communication test method is provided.

BACKGROUND ART

Generally, in times of an increasing number of applications providing wireless connectivity capabilities, there is a growing need of a mobile radio communication test system and a corresponding method especially for verifying correct functioning of said applications in an efficient and flexible manner.

US 2006/0128373 A1 discloses a system and method for testing a wireless device, which uses a test instrument in communication with the wireless device via a radio frequency link. The test instrument has a test procedure preloaded therein, which test procedure is transmitted via the radio frequency link to the wireless device so that the test instrument can perform the test procedure on the wireless device, under the control of the wireless device. The test instrument controls the wireless device to the extent necessary to carry out the test procedure. As it can be seen, due to said preloaded test procedure, the usage of said system or method, respectively, disadvantageously leads to a limited flexibility, and thus also to a reduced efficiency.

Accordingly, there is a need to provide a mobile radio communication test system and a corresponding method especially ensuring both a high flexibility and an increased efficiency.

SUMMARY OF THE INVENTION

According to a first aspect of the invention, a mobile radio communication test system is provided. The mobile radio communication test system comprises a mobile radio test device, a device under test adapted to establish a communication with the mobile radio test device, and a message modification engine configured to monitor at least one message exchanged between the mobile radio test device and the device under test, wherein depending on the content of the at least one message, the message modification engine is further configured to modify the at least one message and/or at least one parameter thereof in both directions. Advantageously, in this manner, both a high flexibility and an increased efficiency can be ensured.

According to a first preferred implementation form of said first aspect of the invention, the mobile radio test device comprises at least one client application. Advantageously, flexibility and efficiency can further be increased.

According to a second preferred implementation form of said first aspect of the invention, at least one client application parameter of the at least one client application is modifiable. Advantageously, testing can be performed in a flexible, and thus also efficient manner.

According to a further preferred implementation form of said first aspect of the invention, the mobile radio test device comprises at least one protocol stack. Advantageously, both flexibility and efficiency can further be increased.

According to a further preferred implementation form of said first aspect of the invention, at least one protocol stack parameter of the at least one protocol stack is modifiable. Advantageously, testing can be performed in a flexible, and thus also efficient, manner.

According to a further preferred implementation form of said first aspect of the invention, software of the at least one protocol stack is protected. Advantageously, for instance, data security can be ensured.

According to a further preferred implementation form of said first aspect of the invention, the message modification engine is configurable through at least one client application, preferably at least one client application of the mobile radio test device. Advantageously, configurations can be done in a very fast and efficient manner.

According to a further preferred implementation form of said first aspect of the invention, a set of modification rules of the message modification engine is specified via the at least one client application. Advantageously, a change management with respect to at least one message can efficiently be implemented.

According to a further preferred implementation form of said first aspect of the invention, the at least one message is exchanged between the at least one protocol stack and the device under test. Advantageously, for instance, the at least one protocol stack can be investigated more precisely.

According to a further preferred implementation form of said first aspect of the invention, the message modification engine is further configured to monitor the at least one message exchanged between the at least one protocol stack and the device under test. Advantageously, for instance, the behavior of the protocol stack can be recorded.

According to a further preferred implementation form of said first aspect of the invention, depending on the content of the at least one message, the message modification engine is further configured to modify the at least one message and/or the at least one parameter thereof in both directions. Advantageously, this allows for a bidirectional investigation of the communication.

According to a further preferred implementation form of said first aspect of the invention, in the case that the at least one message and/or the at least one parameter thereof is modified, the message modification engine is further configured to access public data of the at least one protocol stack. Advantageously, for instance, public data is already sufficient for testing in an accurate manner, thereby ensuring high efficiency.

According to a further preferred implementation form of said first aspect of the invention, in the case that the at least one message and/or the at least one parameter thereof is modified, the message modification engine is further configured to resolve bindings between the at least one protocol stack and the content of the at least one message. Advantageously, for instance, this eases the usage in an integrated development environment.

According to a further preferred implementation form of said first aspect of the invention, in the case that the at least one message and/or the at least one parameter thereof is modified, the message modification engine is further configured to resolve bindings between the at least one protocol stack and the content of the at least one message with the aid of the public data of the at least one protocol stack. Advantageously, for instance, this eases the usage in an integrated development environment, whereby public data is already sufficient, which leads to an increased efficiency.

According to a second aspect of the invention, a mobile radio communication test method is provided. The mobile radio communication test method comprises the steps of monitoring at least one message exchanged between a mobile radio test device and a device under test adapted to establish a communication with the mobile radio test device with the aid of a message modification engine, and modifying the at least one message and/or at least one parameter thereof in both directions with the aid of the message modification engine depending on the content of the at least one message. Advantageously, in this manner, both a high flexibility and an increased efficiency can be ensured.

According to a first preferred implementation form of said first aspect of the invention, the mobile radio test device comprises at least one client application. Advantageously, flexibility and efficiency can further be increased.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
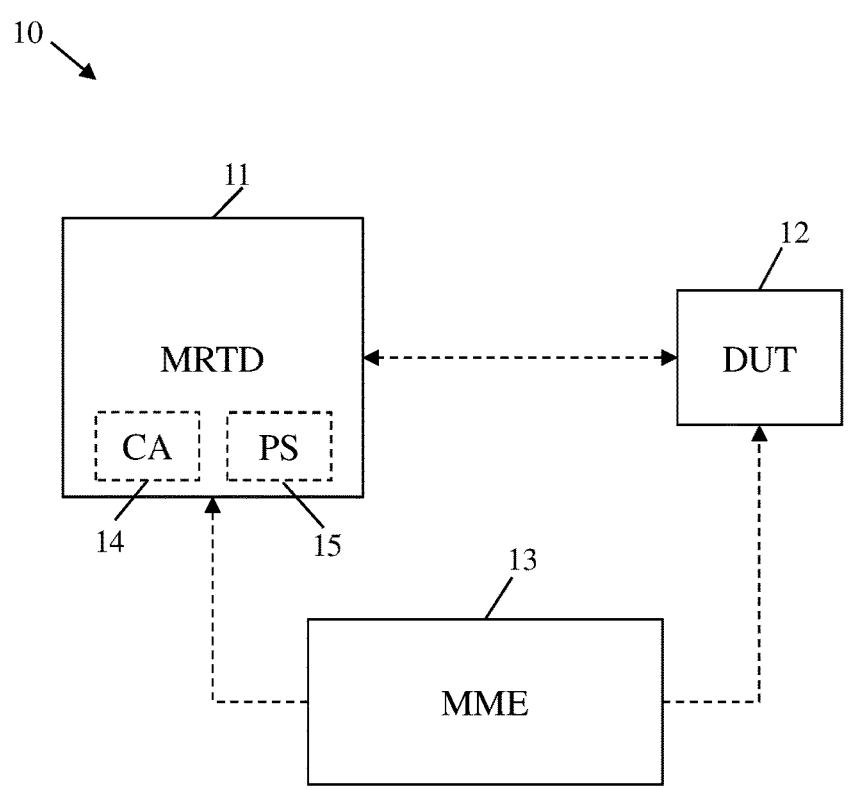
FIG. 1 shows an exemplary embodiment of the first aspect of the invention.

Firstly, FIG. 1 illustrates an exemplary embodiment of the inventive mobile radio communication test system 10. Said mobile radio communication test system 10 comprises a mobile radio test device 11, a device under test 12 adapted to establish a communication with the mobile radio test device 11, and a message modification engine 13.

In this context, the message modification engine 13 is configured to monitor at least one message exchanged between the mobile radio test device 11 and the device under test 12. In addition to this, depending on the content of the at least one message, the message modification engine 13 is further configured to modify the at least one message and/or at least one parameter thereof in both directions.

Furthermore, it might be particularly advantageous if the mobile radio test device 11 comprises at least one client application, exemplarily the client application 14.

Additionally, at least one client application parameter of said at least one client application, exemplarily of the client application 14, may be modifiable.

Moreover, it might be particularly advantageous if the mobile radio test device 11 comprises at least one protocol stack, exemplarily the protocol stack 15.

In addition to this, at least one protocol stack parameter of the at least one protocol stack, exemplarily of said protocol stack 15, may be modifiable.

In further addition to this or as an alternative, software of the at least one protocol stack, exemplarily of the protocol stack 15, may be protected.

With respect to the message modification engine 13, it is noted that said message modification engine 13 may preferably be configurable through at least one client application, preferably at least one client application, exemplarily the client application 14, of the mobile radio test device 11.

In this context, it might be particularly advantageous if a set of modification rules of the message modification engine is specified via the at least one client application, exemplarily the client application 14.

It is further noted that the at least one message may preferably be exchanged between the at least one protocol stack, exemplarily the protocol stack 15, and the device under test 12.

Especially in this case, the message modification engine 13 may further be configured to monitor the at least one message exchanged between the at least one protocol stack, exemplarily the protocol stack 15, and the device under test 12.

Additionally or alternatively, especially depending on the content of the at least one message, the message modification engine 13 may further be configured to modify the at least one message and/or the at least one parameter thereof in both directions.

Furthermore, especially in the case that the at least one message and/or the at least one parameter thereof is modified, the message modification engine 13 may further be configured to access public data of the at least one protocol stack, exemplarily of the protocol stack 15.

In addition to this or as an alternative, especially in the case that the at least one message and/or the at least one parameter thereof is modified, the message modification engine 13 may further be configured to resolve bindings between the at least one protocol stack, exemplarily protocol stack 15, and the content of the at least one message.

In further addition to this or as a further alternative, taking into account the above-mentioned public data, especially in the case that the at least one message and/or the at least one parameter thereof is modified, the message modification engine 13 may further configured to resolve bindings between the at least one protocol stack and the content of the at least one message with the aid of the public data of the at least one protocol stack, exemplarily protocol stack 15.

It is noted that it might be particularly advantageous if the bindings are defined in at least one client application, preferably at least one client application of the mobile radio test device 11, exemplarily the client application 14.

Figure 2:
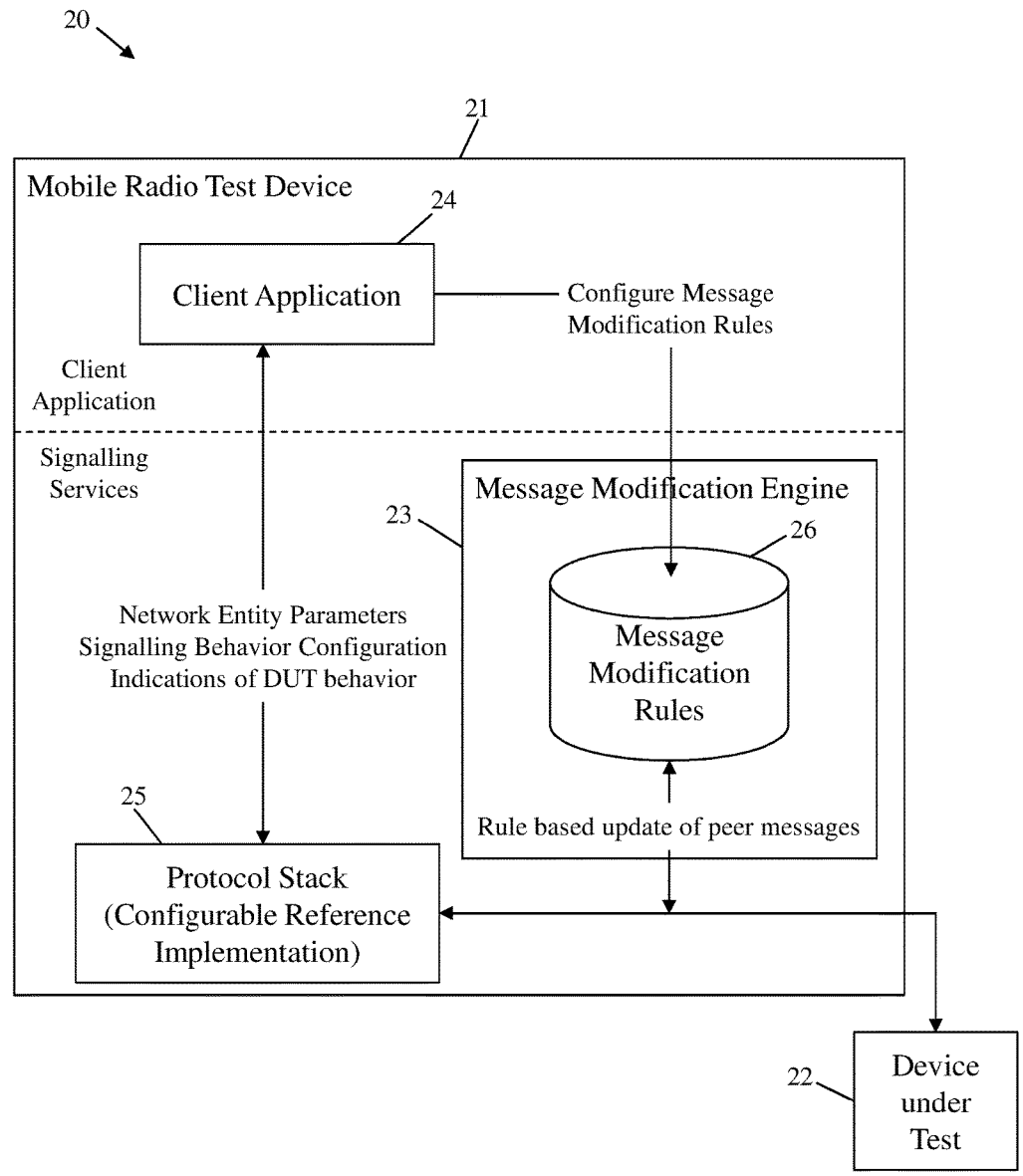
FIG. 2 shows a further exemplary embodiment of the inventive system.

Now, with respect to FIG. 2, a further exemplary embodiment of a mobile radio communication test system 20 is illustrated in accordance with the invention.

Said inventive mobile radio communication test system 20 comprises a mobile radio test device 21 and a device under test 22 adapted to establish a communication, preferably a bidirectional communication, with the mobile radio test device 21, especially with a protocol stack 25 of the mobile radio test device 21. Said protocol stack 25 may preferably be a reference implementation, especially a configurable reference implementation.

Furthermore, said mobile radio test device 21 does not only comprise said protocol stack 25 but also a message modification engine 23 and a client application 24, wherein the message modification engine 23 comprises a set of message modification rules 26.

Between the client application 24 of the mobile radio test device 21 and the protocol stack 25 of the mobile radio test device 21, at least one of the following types of data is exchanged: network entity parameters, signalling behaviour configuration, indications with respect to the behaviour of the device under test 22.

In addition to this, with the aid of the client application 24 of the mobile radio test device 21, message modification rules of the set of message modification rules 26 are configured.

With respect to the communication between the device under test 22 and the mobile radio test device 21, especially the protocol stack 25 of said mobile radio test device 21, the message modification engine 23 is configured to update and/or modify peer messages on the basis of the set of message modification rules 26.

It is noted that as it can be seen, the mobile radio test device 21 can be divided into two major parts: on the one hand, the client application part comprising the client application 24, and on the other hand, the signalling services part comprising the message modification engine 23 with its set of message modification rules 26 and the protocol stack 25.

Generally, with respect to the invention, it is further noted that the inventive system can be configured via entity parameters and allows for influencing the respective peer message contents. In this context, the respective signalling reference implementation can preferably be configured via the respective entity parameters and will especially create peer messages according to said entity parameters.

In addition to this, the content of said messages can be modified as they are exchanged with the device under test especially in order to test device behaviour preferably for different peer message content variations. In this context, the inventive message modification engine especially allows for specifying rules to update the respective message contents preferably comprising assigning constant values and/or defining run-time evaluated bindings to system variables.

Advantageously, the invention especially allows a type safe creation of message modification statements. This especially eases the usage in an integrated development environment and avoids that the user has to learn a specific grammar, thereby ensuring testing in a highly efficient manner. In this context, it is noted that a respective transformation is preferably not textually represented.

Further advantageously, user applications and/or a respective reference implementation can especially run in a client-server architecture. The user can preferably override message contents especially without giving the user direct access to the respective reference implementation code or to use call backs which could exemplarily cause crashes and/or timing problems.

Figure 3:
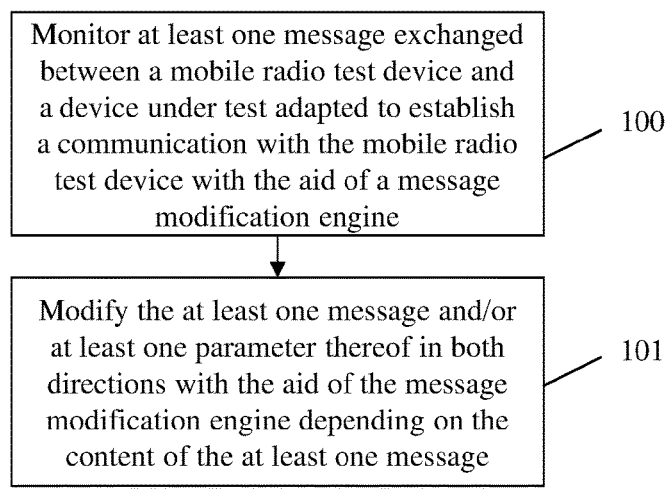
FIG. 3 shows a flow chart of an exemplary embodiment of the second aspect of the invention.

Finally, FIG. 3 shows a flow chart of an exemplary embodiment of the inventive mobile radio communication test method. In a first step 100, at least one message exchanged between a mobile radio test device and a device under test adapted to establish a communication with the mobile radio test device is monitored with the aid of a message modification engine. Then, in a second step 101, the at least one message and/or at least one parameter thereof is modified in both directions with the aid of the message modification engine depending on the content of the at least one message.

In this context, it might be particularly advantageous if the mobile radio test device comprises at least one client application.

In addition to this, the inventive method may further comprise the step of modifying at least one client application parameter of the at least one client application.

Additionally or alternatively, the mobile radio test device may comprise at least one protocol stack.

With respect to said protocol stack, said mobile radio communication test method may further comprise the step of modifying at least one protocol stack parameter of the at least one protocol stack.

It might be further advantageous if software of the at least one protocol stack is protected.

Moreover, it is noted that the method according to the second aspect of the invention may further comprise the step of configuring the message modification engine through at least one client application, preferably at least one client application of the mobile radio test device.

In this context, a set of modification rules of the message modification engine may be specified via the at least one client application.

Furthermore, the at least one message may especially be exchanged between the at least one protocol stack and the device under test.

In this context, it might be particularly advantageous if the inventive method further comprises the step of monitoring the at least one message exchanged between the at least one protocol stack and the device under test with the aid of the message modification engine.

In addition to this, the method according to the second aspect of the invention may further comprise the step of modifying the at least one message and/or the at least one parameter thereof in both directions with the aid of the message modification engine depending on the content of the at least one message.

Moreover, especially in the case that the at least one message and/or the at least one parameter thereof is modified, the method may further comprise the step of accessing public data of the at least one protocol stack with the aid of the message modification engine.

In addition to this or as an alternative, especially in the case that the at least one message and/or the at least one parameter thereof is modified, the inventive method may further comprise the step of resolving bindings between the at least one protocol stack and the content of the at least one message with the aid of the message modification engine.

In further addition to this or as an further alternative, especially in the case that the at least one message and/or the at least one parameter thereof is modified, the method according to the invention may further comprise the step of configuring the message modification engine to resolve bindings between the at least one protocol stack and the content of the at least one message with the aid of the public data of the at least one protocol stack.

In this context, it might be particularly advantageous if the bindings are defined in at least one client application, preferably at least one client application of the mobile radio test device.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A mobile radio communication test system comprising:
  a mobile radio test device comprising at least one protocol stack,
  a device under test adapted to establish a communication with the mobile radio test device, and a message modification engine configured to monitor at least one message exchanged between the mobile radio test device and the device under test, wherein depending on content of the at least one message, the message modification engine is further configured to:

modify the at least one message and/or at least one parameter thereof in both directions;

access public data of the at least one protocol stack; and resolve bindings between the at least one protocol stack and the content of the at least one message.

2. The mobile radio communication test system according to claim 1, wherein the mobile radio test device comprises at least one client application.

3. The mobile radio communication test system according to claim 2, wherein at least one client application parameter of the at least one client application is modifiable.

4. The mobile radio communication test system according to claim 1, wherein at least one protocol stack parameter of the at least one protocol stack is modifiable.

5. The mobile radio communication test system according to claim 1, wherein software of the at least one protocol stack is protected.

6. The mobile radio communication test system according to claim 1, wherein the message modification engine is configurable through at least one client application, preferably at least one client application of the mobile radio test device.

7. The mobile radio communication test system according to claim 6, wherein a set of modification rules of the message modification engine is specified via the at least one client application.

8. The mobile radio communication test system according to claim 1, wherein the at least one message is exchanged between the at least one protocol stack and the device under test.

9. The mobile radio communication test system according to claim 8, wherein the message modification engine is further configured to monitor the at least one message exchanged between the at least one protocol stack and the device under test.

10. The mobile radio communication test system according to claim 9, wherein depending on the content of the at least one message, the message modification engine is further configured to modify the at least one message and/or the at least one parameter thereof in both directions.

11. The mobile radio communication test system according to claim 1, wherein in the case that the at least one message and/or the at least one parameter thereof is modified, the message modification engine is further configured to resolve the bindings between the at least one protocol stack and the content of the at least one message.

12. The mobile radio communication test system according to claim 1, wherein in the case that the at least one message and/or the at least one parameter thereof is modified, the message modification engine is further configured to resolve the bindings between the at least one protocol stack and the content of the at least one message with aid of the public data of the at least one protocol stack.

13. The mobile radio communication test system according to claim 11, wherein the bindings are defined in at least one client application, preferably at least one client application of the mobile radio test device.

14. The mobile radio communication test system according to claim 12, wherein the bindings are defined in at least one client application, preferably at least one client application of the mobile radio test device.

15. A mobile radio communication test method comprising the steps of:

monitoring at least one message exchanged between a mobile radio test device and a device under test adapted to establish a communication with the mobile radio test device with the aid of a message modification engine, wherein the mobile radio test device comprises at least one protocol stack;

modifying the at least one message and/or at least one parameter thereof in both directions with the aid of the message modification engine depending on the content of the at least one message;

access public data of the at least one protocol stack; and resolve bindings between the at least one protocol stack and the content of the at least one message.

16. The mobile radio communication test method according to claim 15, wherein the mobile radio test device comprises at least one client application.

* * * * *